US009850007B2

(12) United States Patent
Kalisz et al.

(10) Patent No.: US 9,850,007 B2
(45) Date of Patent: *Dec. 26, 2017

(54) CONSUMABLE BUSHING FOR USE WITH AIRCRAFT WING REPAIR SYSTEMS AND METHODS

(71) Applicant: Kellstrom Defense Aerospace, Inc., Miramar, FL (US)

(72) Inventors: John Burton Kalisz, Newhall, CA (US); Joshua Ryan Werner, Camarillo, CA (US)

(73) Assignee: Kellstrom Defense Aerospace, Inc., Miramar, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/637,420

(22) Filed: Jun. 29, 2017

(65) Prior Publication Data
US 2017/0320596 A1 Nov. 9, 2017

Related U.S. Application Data

(60) Continuation of application No. 15/418,373, filed on Jan. 27, 2017, now Pat. No. 9,731,842, which is a
(Continued)

(51) Int. Cl.
*B64F 5/00* (2017.01)
*B64F 5/40* (2017.01)
(Continued)

(52) U.S. Cl.
CPC ............... *B64F 5/40* (2017.01); *B23B 49/02* (2013.01); *B23Q 9/0057* (2013.01); *B64C 3/26* (2013.01); *B23B 2215/04* (2013.01)

(58) Field of Classification Search
CPC  B23P 19/00; B23P 19/04; B23P 19/06; B23P 23/06; B23Q 1/03; B23Q 3/06; B23Q 3/155
See application file for complete search history.

(56) References Cited

U.S. PATENT DOCUMENTS

| 2,412,972 A | 12/1946 | Dean |
| 2,417,539 A | 3/1947 | Aronson |

(Continued)

FOREIGN PATENT DOCUMENTS

| CN | 201361733 Y | 12/2009 |
| EP | 2138730 A2 | 12/2009 |

OTHER PUBLICATIONS

Federal Aviation Administration, "Chapter 4: Aircraft Metal Structure Repair", Aviation Maintenance Technician Handbook—Airframe, vol. 1, Apr. 16, 2012, 114 pages, United States Department of Transportation, Federal Aviation Administration, Airman Testing Standards Branch.

(Continued)

*Primary Examiner* — Lee D Wilson
(74) *Attorney, Agent, or Firm* — Alston & Bird LLP

(57) ABSTRACT

A wing skin, which was secured to a wing structure by a plurality of fasteners extending through the wing skin, is removed from the wing and aligned with a template. Template holes are drilled through the template corresponding to each of the fastener holes of the wing skin. The template is then aligned with a new wing skin, and pilot holes are drilled through the new wing skin corresponding to each of the template holes. The new wing skin is then aligned with the wing structure such that the pilot holes permit access to corresponding fastener holes of the wing structure. A mill bit is then positioned through each pilot hole and aligned with the center of the corresponding consumable bushing in the fastener hole of the wing sub-structure, and the skin pilot holes are milled to form fastener holes in the new wing skin aligned with existing sub-structure.

19 Claims, 10 Drawing Sheets

Related U.S. Application Data division of application No. 15/148,532, filed on May 6, 2016, now Pat. No. 9,598,183.

(51) Int. Cl.
    *B64C 3/26* (2006.01)
    *B23Q 9/00* (2006.01)
    *B23B 49/02* (2006.01)

(56) References Cited

U.S. PATENT DOCUMENTS

| | | | |
|---|---|---|---|
| 2,483,686 A | 10/1949 | Wing | |
| 2,605,552 A | 8/1952 | Jennings | |
| 2,692,425 A | 10/1954 | Martin | |
| 3,065,940 A * | 11/1962 | Eckstein | B64C 3/26 244/130 |
| 4,048,708 A | 9/1977 | Briles | |
| 4,400,884 A | 8/1983 | Baresh et al. | |
| 4,703,648 A * | 11/1987 | Baresh | G01B 1/00 33/552 |
| 5,059,059 A | 10/1991 | Cox | |
| 7,195,429 B2 * | 3/2007 | Dods | B23B 47/287 408/115 R |
| 7,726,637 B2 | 6/2010 | Stevenson et al. | |
| 8,220,222 B2 | 7/2012 | Ciprian | |
| 8,387,226 B2 | 3/2013 | Weigel, Jr. et al. | |
| 8,677,625 B2 | 3/2014 | Roux et al. | |
| 8,732,936 B2 | 5/2014 | Auriol et al. | |
| 8,757,937 B1 * | 6/2014 | Inman | B23B 49/026 408/115 R |
| 9,598,183 B1 * | 3/2017 | Kalisz | B64F 5/0036 |
| 9,731,809 B1 | 8/2017 | Kalisz et al. | |
| 9,731,842 B1 | 8/2017 | Kalisz et al. | |
| 2002/0166219 A1 | 11/2002 | David et al. | |
| 2005/0116105 A1 | 6/2005 | Munk et al. | |
| 2009/0220314 A1 | 9/2009 | Collado Briceno et al. | |
| 2010/0143527 A1 | 6/2010 | Mathai et al. | |
| 2010/0211016 A1 | 8/2010 | Palmer-Felgate | |
| 2010/0295296 A1 | 11/2010 | Kawamata | |
| 2015/0056034 A1 | 2/2015 | Anson et al. | |

OTHER PUBLICATIONS

International Searching Authority, International Search Report and Written Opinion for International Application No. PCT/US2017/015613, dated Apr. 25, 2017, 18 pages, European Patent Office, Netherlands.

United States Patent and Trademark Office, Notice of Allowance for U.S. Appl. No. 15/148,532, dated Nov. 4, 2016, 14 pages, U.S.A.

United States Patent and Trademark Office, Notice of Allowance for U.S. Appl. No. 15/418,349, dated May 1, 2017, 8 pages, U.S.A.

United States Patent and Trademark Office, Office Action for U.S. Appl. No. 15/418,349, dated Mar. 31, 2017, 11 pages, U.S.A.

United States Patent and Trademark Office, Office Action for U.S. Appl. No. 15/148,373, dated Mar. 22, 2017, 14 pages, U.S.A.

United States Patent and Trademark Office, Notice of Allowance for U.S. Appl. No. 15/148,373, dated Apr. 26, 2017, 5 pages, U.S.A.

* cited by examiner

CONSUMABLE BUSHING FOR USE WITH AIRCRAFT WING REPAIR SYSTEMS AND METHODS

CROSS-REFERENCE TO RELATED APPLICATIONS

This application is a continuation patent application of U.S. Nonprovisional patent application Ser. No. 15/418,373, filed Jan. 27, 2017; which application is a divisional of U.S. Nonprovisional patent application Ser. No. 15/148,532, filed May 6, 2016 and now U.S. Pat. No. 9,598,183; the contents of both of which as are hereby incorporated by reference in their entirety.

BACKGROUND

As aircraft remain in service for several decades, oftentimes even beyond their expected service life, the wings of these aircraft may become corroded or otherwise damaged from prolonged service. This damage, which may include holes, tears, scratches, cuts, and/or the like in the skin of the wing, is particularly acute in high-speed aircraft. In high-speed applications, such damage may result in a change in the drag and/or lift coefficients of the wings, which may ultimately result in decreased performance, structural failure, and/or flight safety of the aircraft.

In many applications, the skin of an aircraft wing is attached to an underlying wing structure (e.g., spars, ribs, internal braces, and/or the like) by aligning a solid, undrilled skin portion over the underlying wing structure, and drilling fastener holes through the skin and into the underlying wing structure. Fasteners (e.g., rivets, JO-BOLTS, HI-LOCK fasteners, and/or the like) are then secured in the fastener holes to secure the skin to the underlying wing structure. While the number of fasteners ultimately used to secure the skin to the underlying wing structure varies in part on the size of the wing, many aircraft wings utilize thousands of fasteners to secure the skin to the underlying wing structure. Moreover, the fastener holes are often drilled by hand during the manufacturing process, resulting in a significant variation in the fastener hole pattern across different aircraft wings, even between aircrafts of the same model.

Because of the high degree of precision required in aligning aircraft wing skins over the underlying wing structure and the high degree of complexity involved in aligning thousands of hand-drilled fastener holes, aircraft wing skins have historically not been replaced once damaged. Instead, the aircraft is typically retired and/or scrapped. Alternatively, an entirely new wing may be fabricated and purchased at a high cost, again by securing the new skin to the new underlying wing structure in a manner as described herein. Such ensures that the necessary manufacturing tolerances of the aircraft wing remain intact; however, in many cases, the underlying wing structure remains structurally sound even when the overlying wing skin has been corroded or damaged from prolonged use and thus this approach results in costly scrap of the original underlying wing structure that remains structurally sound.

To avoid the above-outlined inefficiencies and expenses, some efforts have been undertaken to digitally and/or mathematically model original aircraft wing skins and their underlying wing structures, so as to facilitate duplication of the fastener hole pattern on a new aircraft wing skin. These efforts have, however, largely failed due to the inability of digital and/or mathematical modeling techniques to account for physical parameters, such as the changing thermal characteristics of the aircraft wing skins and their underlying wing structures over periods of time in which the modeling would occur. Specifically, due to environmental changes, misalignments would nevertheless arise in these types of digital and/or mathematical modeling techniques.

Accordingly, systems and methods are needed for precisely replicating a fastener hole pattern of an aircraft wing such that a damaged wing skin may be replaced with a new wing skin that may be coupled to an existing and structurally sound underlying wing structure. Still further, innovative and cost effective life extension programs are of critical importance in maintaining flightworthiness and ongoing usefulness in operation of legacy aircraft platforms.

BRIEF SUMMARY

According to various embodiments, there is provided a method of repairing an aircraft wing by reskinning the wing surface at a fraction of the cost of what a new wing (skin and sub-structure) would cost. The method comprises the steps of: generating a skin template having template holes corresponding to each of the fastener holes of the original skin, wherein the template holes have a diameter no greater than a diameter of the corresponding fastener holes; drilling pilot holes corresponding to each of the template holes in a new skin, wherein the pilot holes have a diameter smaller than a diameter of the corresponding fastener holes; aligning the new skin with the existing underlying wing structure such that each of the pilot holes is aligned with a corresponding fastener hole of the existing underlying aircraft wing structure such that a center point of each fastener hole of the existing underlying aircraft wing structure is accessible through the corresponding pilot hole of the new skin; aligning a mill bit with the center point of each fastener hole of the existing underlying wing structure such that the mill bit extends through the corresponding pilot hole of the new skin; and milling material from around the entire perimeter of each pilot hole of the new skin to form fastener holes in the new skin that align with the fastener holes of the existing underlying wing structure.

According to various embodiments, there is also provided a method of creating a replacement aircraft wing skin to repair an aircraft wing, wherein the aircraft wing comprises an original wing skin secured to an underlying wing structure by a plurality of fasteners extending through fastener holes of the wing skin and corresponding fastener holes of the underlying wing structure. The method comprises the steps of: generating a skin template having template holes corresponding to each of a plurality of fastener holes extending through the original wing skin, wherein the diameter of the template holes is no greater than the diameter of the fastener holes of the original wing skin; and drilling pilot holes corresponding to each of the template holes in a new skin, wherein the pilot holes have a diameter smaller than a diameter of the corresponding fastener holes; and wherein the pilot holes are positioned such that, when the new skin is aligned with the underlying wing structure, the entirety of each pilot hole is positioned within a circle aligned with the perimeter of the corresponding fastener hole of the underlying wing structure.

According to various embodiments, there is also provided a consumable bushing to facilitate alignment of a new wing skin having a plurality of pilot holes therein onto an existing underlying wing structure having a plurality of fastener holes therein corresponding to each of the plurality of pilot holes. The consumable bushing comprises: a cylindrical body portion having a first diameter, a first end, and a second end, and defining a guide hole having a second diameter and extending through the cylindrical body between the first end and the second end, and wherein the guide hole is substantially concentric with the first diameter; and a thin flange extending outward away from the cylindrical body at least partially around the cylindrical body at the first end such that the thin flange has at least one dimension greater than the first diameter; and wherein: the first diameter is sized such that the cylindrical body fits snugly within one of the fastener holes of the underlying wing structure such that the thin flange is positioned adjacent the underlying wing structure and the guide hole is substantially concentric with the fastener hole and is accessible through a corresponding pilot hole of a new wing skin aligned relative to the underlying wing structure such that a mill bit may be positioned through the pilot hole and into the guide hole; and the cylindrical body portion and the thin flange are consumable such that the cylindrical body and the thin flange are configured to be cut by the mill bit as the mill bit enlarges the pilot hole of the new wing skin.

According to various embodiments, there is provided a method of repairing an aircraft wing. The method comprises the steps of: drilling pilot holes in a new skin, wherein each of the pilot holes correspond to template holes on a skin template, wherein each of the template holes correspond to each fastener hole of an original skin, wherein each of the template holes have a diameter no greater than a diameter of the corresponding fastener holes of the original skin, and wherein the pilot holes have a diameter smaller than the diameter of the corresponding fastener holes of the original skin; aligning the new skin with an existing underlying wing structure such that each of the pilot holes is aligned with a corresponding fastener hole of the existing underlying aircraft wing structure such that a portion of each fastener hole of the existing underlying aircraft wing structure is accessible through the corresponding pilot hole of the new skin; aligning a mill bit with the portion of each fastener hole of the existing underlying wing structure such that a portion of the mill bit extends through the corresponding pilot hole of the new skin; and milling material from around an entire perimeter of each pilot hole of the new skin to form fastener holes in the new skin that align with the fastener holes of the existing underlying wing structure.

According to various embodiments, there is provided a method of creating a replacement aircraft wing skin to repair an aircraft wing, wherein the aircraft wing comprises an original wing skin secured to an underlying wing structure by a plurality of fasteners extending through fastener holes of the wing skin and corresponding fastener holes of the underlying wing structure. The method comprises the step of drilling pilot holes in a new skin, wherein: the pilot holes correspond to each of a set of template holes on a skin template that correspond to each of a plurality of fastener holes extending through an original wing skin, a diameter of the template holes is no greater than a diameter of the corresponding fastener holes of the original wing skin, the pilot holes have a diameter smaller than the diameter of the corresponding fastener holes of the original wing skin, and the pilot holes are positioned such that, when the new skin is aligned with the underlying wing structure, the entirety of each pilot hole is positioned within a circle aligned with a perimeter of the corresponding fastener hole of the underlying wing structure.

According to various embodiments, there is provided a consumable bushing to facilitate alignment of a new wing skin having a plurality of pilot holes therein onto an existing underlying wing structure having a plurality of fastener holes therein corresponding to each of the plurality of pilot holes. The consumable bushing comprises: a cylindrical body portion having a first diameter, a first end, and a second end, and defining a guide hole having a second diameter and extending through the cylindrical body between the first end and the second end; and a thin flange extending outward away from the cylindrical body at least partially around the cylindrical body near the first end such that the thin flange has at least one dimension greater than the first diameter; wherein: the first diameter is sized such that the cylindrical body fits snugly within one of the fastener holes of the underlying wing structure such that the thin flange is positioned adjacent the underlying wing structure and the guide hole is aligned with the fastener hole and is accessible through a corresponding pilot hole of a new wing skin aligned relative to the underlying wing structure such that a mill bit may be positioned through the pilot hole and into the guide hole; and the cylindrical body portion and the thin flange are consumable such that the cylindrical body and the thin flange are configured to be cut by the mill bit as the mill bit enlarges the pilot hole of the new wing skin.

According to various embodiments, there is provided a consumable bushing to facilitate alignment of a new wing skin having a plurality of pilot holes therein onto an existing underlying wing structure having a plurality of fastener holes therein corresponding to each of the plurality of pilot holes. The consumable bushing comprises: a cylindrical body portion having a first diameter, a first end, and a second end, and defining a guide hole having a second diameter and extending through the cylindrical body between the first end and the second end, and wherein the guide hole is substantially concentric with the first diameter; and a thin flange extending outward away from the cylindrical body at least partially around the cylindrical body at the first end such that the thin flange has a flange diameter greater than the first diameter; wherein: the first diameter is sized such that the cylindrical body fits snugly within one of the fastener holes of the underlying wing structure such that the thin flange is positioned adjacent the underlying wing structure and the guide hole is substantially concentric with the fastener hole and is accessible through a corresponding pilot hole of a new wing skin aligned relative to the underlying wing structure such that a mill bit may be positioned through the pilot hole and into the guide hole; and the cylindrical body portion and the thin flange are consumable such that the cylindrical body and the thin flange are configured to be cut by the mill bit as the mill bit enlarges the pilot hole of the new wing skin.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Various embodiments are directed to a method for replacing a wing skin of an aircraft wing and for precisely locating the relative positions of the fastener holes of the original wing components (e.g., the original wing skin and/or the existing underlying wing structure). In various embodiments, after a wing is removed from an aircraft, it is mounted within a wing fixture to securely hold the wing in place to ensure that the wing does not flex during the wing skin removal or replacement procedures, and to facilitate performing tasks on the wing while it is removed from the aircraft. As utilized herein, those portions of the wing that have been removed from the aircraft are referred to herein as "original" or "existing" components in order to distinguish these components from the new and/or replacement components utilized throughout the process.

Figure 2:
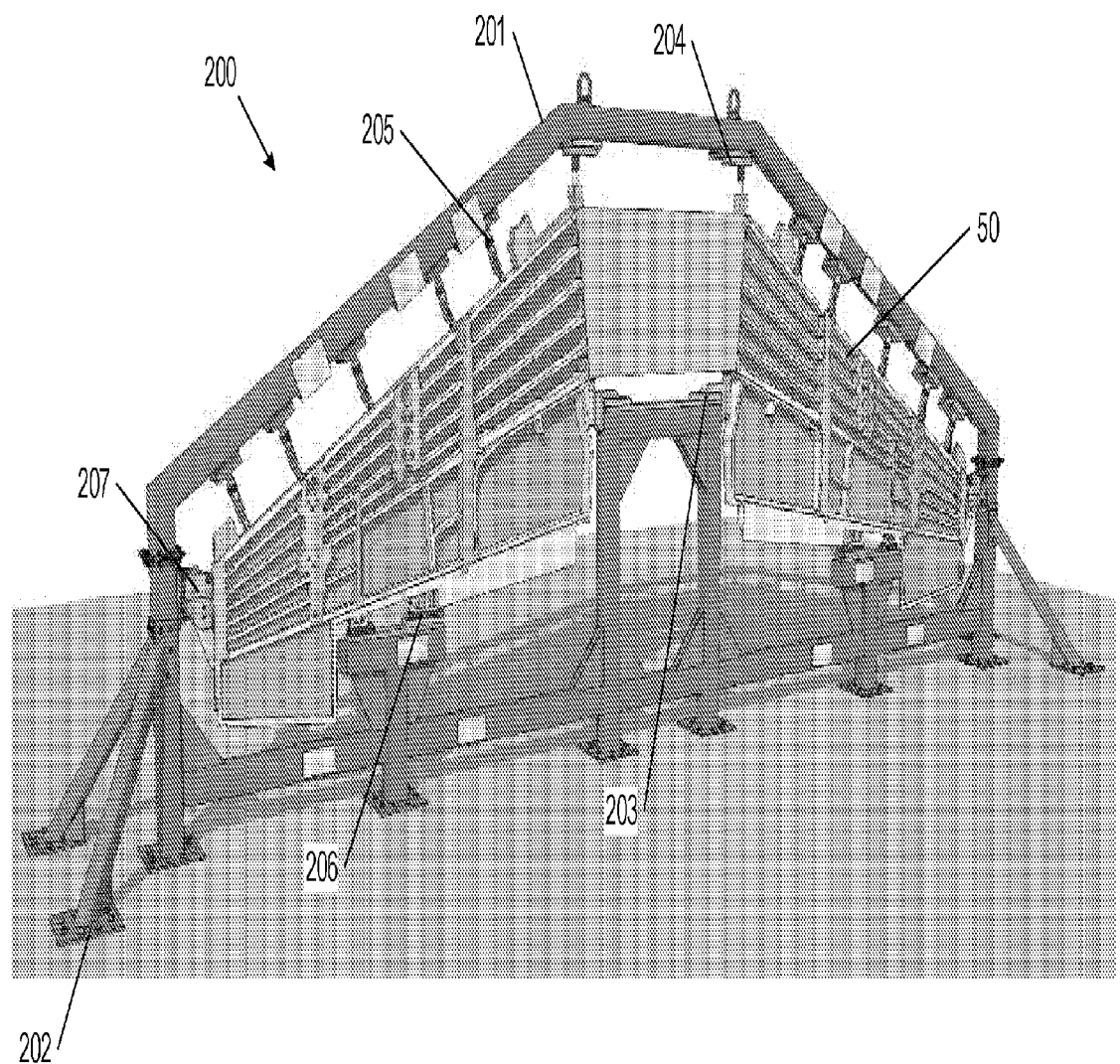
FIG. 2 shows an aircraft wing secured within an exemplary wing fixture according to various embodiments.

After mounting the wing within the wing fixture, the fasteners securing the original skin to the existing underlying wing structure are removed, and the original wing skin is removed from the existing underlying wing structure. The wing fixture is specially configured to isolate the original skin and the existing underlying wing structure from the surrounding environment and to still further retain both securely relative to one another, as the fasteners are removed. The specially designed wing fixture holds the original skin and the existing underlying wing structure rigidly in a manner so as to prevent any twisting or warping of existing underlying wing structure once the original skin is removed. In certain embodiments, the wing fixture holds the original skin and the existing underlying wing structure in a vertical configuration, allowing technicians clear access for fastener and skin removal, as illustrated in FIG. 2. As may be seen therein, the wing is supported primarily through the base of the center section of the wing fixture via a fuselage attach rib. It is secured both top and bottom at the leading edge and trailing edge by bolts attached to actuators and support brackets. Special wing tip adapters are utilized to secure the wing tips. All of these components are configured to collectively permit the wing fixture to allow the wing to "relax" in the fixture prior to tightening the securing bolts, which prevents any artificial "set" due to structure and/or changing environmental conditions.

According to various embodiments, an electrostatic drill is used to remove the heads from the installed fasteners without manual drilling, which could result in damage to the original skin or the existing underlying wing structure. The electrostatic drill uses a circular electrode that is sized for the specific fastener being removed, such that the drill burns through the fastener head just outside the diameter of the shank thereof. The depth of drill is controlled by the machine program to match the specific diameter and any remaining shank of the fastener is the same diameter as the hole, such that the fastener may be driven backwards through the skin and structure to remove it.

Once all fasteners are removed, the original wing skin is then aligned with a template, and holes are drilled into the template at the location of each of the fastener holes of the original wing skin. This resulting template, which includes drilled holes corresponding to the sizes and locations of each of the fastener holes of the original wing skin, is then aligned with a new wing skin, and pilot holes are drilled through the holes of the template and through the new skin to define pilot holes corresponding to the location of each of the holes of the template. These pilot holes are undersized relative to the ultimate size needed to secure the new skin to the existing underlying wing structure. The new skin is then aligned with the existing underlying wing structure still secured in the wing fixture; however, prior to positioning the new skin on the existing underlying wing structure, consumable bushings having concentric holes are placed into each of the fastener holes of the existing underlying wing structure.

As outlined above and discussed in further detail below, the hole transfer from the original skin to the new skin is a multi-step process that is carefully controlled to ensure accurate transfer of hole position and angle. Notably, when the original skin was attached to the original substructure of the wing during original manufacture, the holes were drilled by hand through both the skin and the structure, resulting in a unique hole pattern (positions and angles) for each wing. Thus, accurate transfer of both hole position and angle is crucial. To accomplish, various embodiments utilize the template described above and elsewhere herein. As an initial step the template is placed on a set of contour boards that match the outer mold line of the wing, so as to ensure the template matches the wind swept contour the wing, thereby minimizing any hole misalignment due to contour parallax, as detailed elsewhere herein. In certain embodiments the template is machined from aluminum to match the thermal coefficient of expansion of the skin, so as to further minimize or substantially eliminate any misalignment due to ambient temperature fluctuations.

The original skin is then placed on top of the template and aligned with the edges thereof according to various embodiments. Clamps are utilized after both components are allowed to "relax" into corresponding/matching thermal and physical characteristics. Pilot holes are then drilled in the template by drilling from the back of the original skin through bushings inserted in the skin, again as detailed elsewhere herein. These "first" bushings prevent any inadvertent damage to the hole in the old skin that may affect the transfer, while also accurately capturing the hole direction vector (thus, accounting for both hole position and angle). The pilot holes may then, according to certain embodiments, be brought to the original skin hole size through the old skin.

Figure 3A:
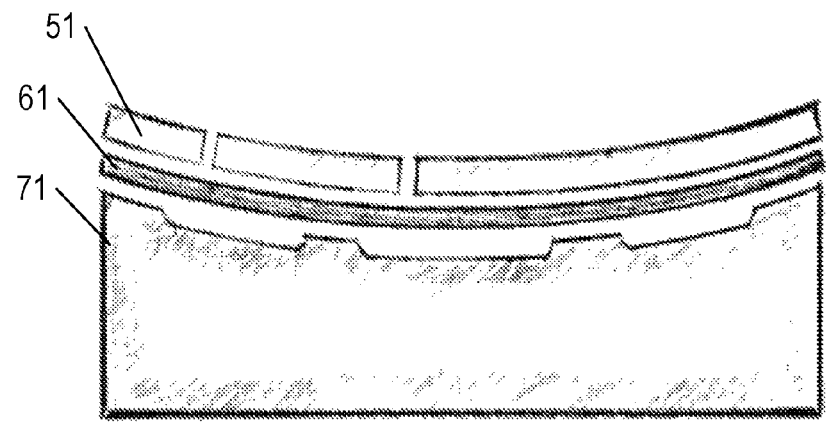
FIGS. 3A-3B show exemplary relative positioning of an original wing skin and a template while the template is having template holes drilled there-through in conjunction with a bushing for vector alignment.
Figure 3B:
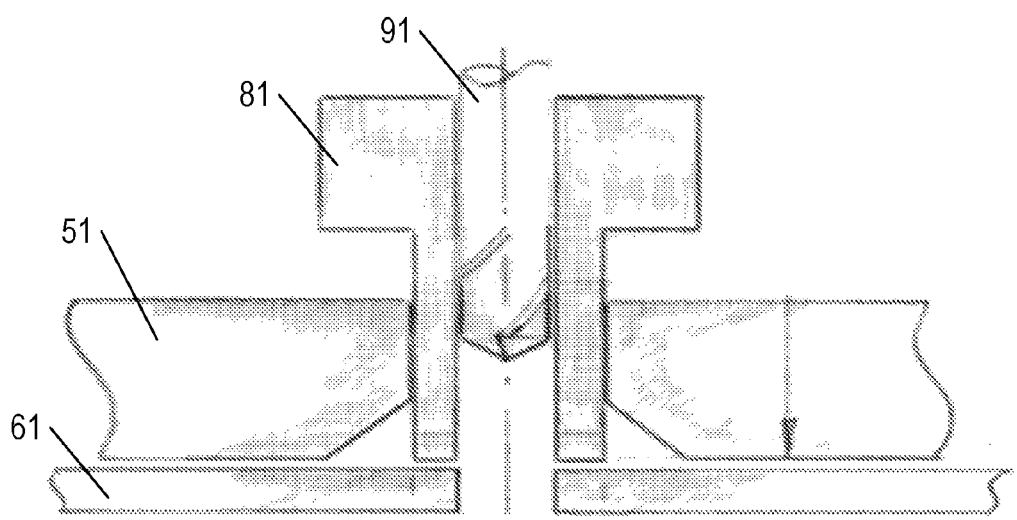
Figure 4A:
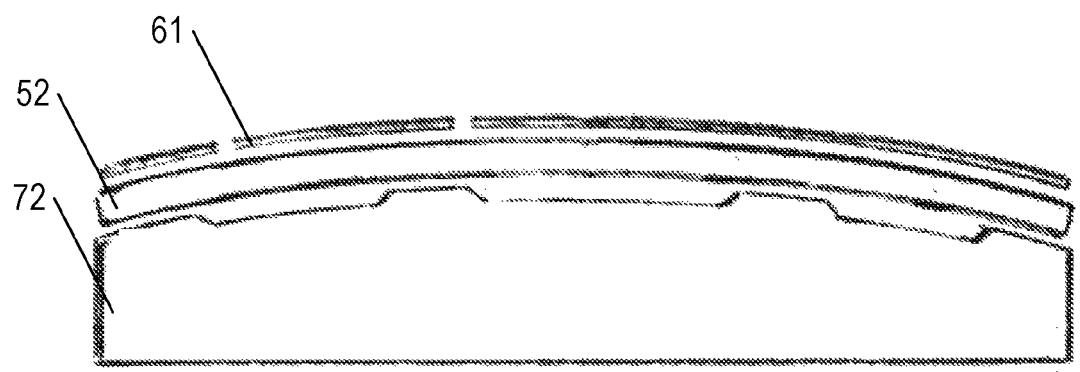
FIGS. 4A-4B show exemplary relative positioning of a new wing skin and the template while the new wing skin is having pilot holes drilled there-through in conjunction with a bushing for hole alignment.

Following the above-outlined original skin to template transfer procedure, the new wing skin may be placed on a contour nest shaped to the inner mold line of the wing skin (compare FIGS. 3A and 4A, as detailed elsewhere herein). The contour nest need not be precision-built; it may be made of any material, with wood being a non-limiting example, as detailed elsewhere herein. The drilled template may then according to various embodiments be removed from the previous fixture (associated with the original skin) and placed on top of the new skin within the contour nest. In this manner the drilled template and the new skin rest in the contour nest, as detailed elsewhere herein. When so resting, the edges of each of the drilled template and the new skin are aligned and both are allowed to "relax" prior to clamping thereof relative to one another. Once clamped, in certain embodiments, pilot holes may be drilled in the new skin by drilling through the template holes. Once again, bushings ("second bushings," as referred to elsewhere herein) are used to prevent damage to the template holes and to capture the hole vector (position and angle) as accurately as possible. These bushings are much wider and deeper than those used in the transfer from the original skin, to ensure pickup precision of the hole vector and provide proper hole size, as may be understood by comparison of FIGS. 3B and 5A. It should be understood that the hole size is established in this process to balance tolerance considerations with properly (engineered) mill strength limits.

Following transfer of the hole pattern from the drilled template to the new skin while both are resting in the contour next, the new wing skin may be placed back onto the existing underlying wing structure. At that time, concentric holes of consumable bushings are used to locate the center of the fastener holes of the existing underlying wing structure, regardless of whether the pilot holes of the new wing skin are concentric. Each of the pilot holes are then milled to be concentric with the corresponding fastener holes of the existing underlying wing structure. This is done by positioning a mill bit through the pilot hole and into the corresponding concentric hole of the consumable bushing, and by milling the new wing skin around the initial placement of the mill to form a fastener hole extending through the new wing skin that is concentric with the corresponding fastener hole of the existing underlying wing structure. The fastener holes of the new wing skin may then be finished (e.g., by reaming the holes to a final diameter and/or by countersinking the holes to correspond to the heads of the fasteners to be used to secure the new wing skin to the existing underlying wing structure). The new wing skin may then be secured to the existing underlying wing structure using fasteners extending through each of the corresponding sets of fastener holes of the new wing skin and existing underlying wing structure.

Figure 7:
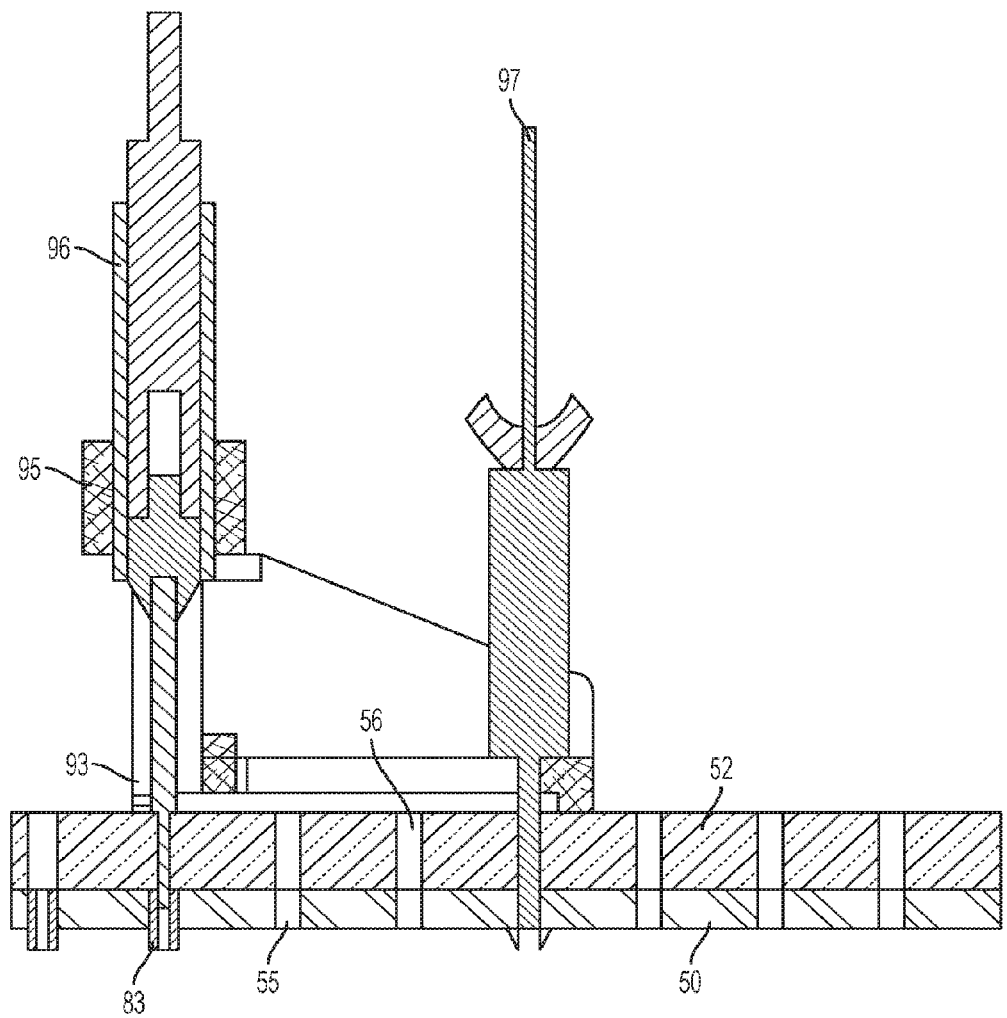
FIG. 7 shows the relative positioning of various components utilized according to another embodiment in milling/finishing/reaming the fastener holes of the new wing skin while such is positioned over the existing underlying wing structure, wherein illustrated specifically is a drawing clamp, stability bushing, and mill fixture assembly that may be utilized in conjunction with the mill bit or mill cutter of FIG. 6.
Figure 8:
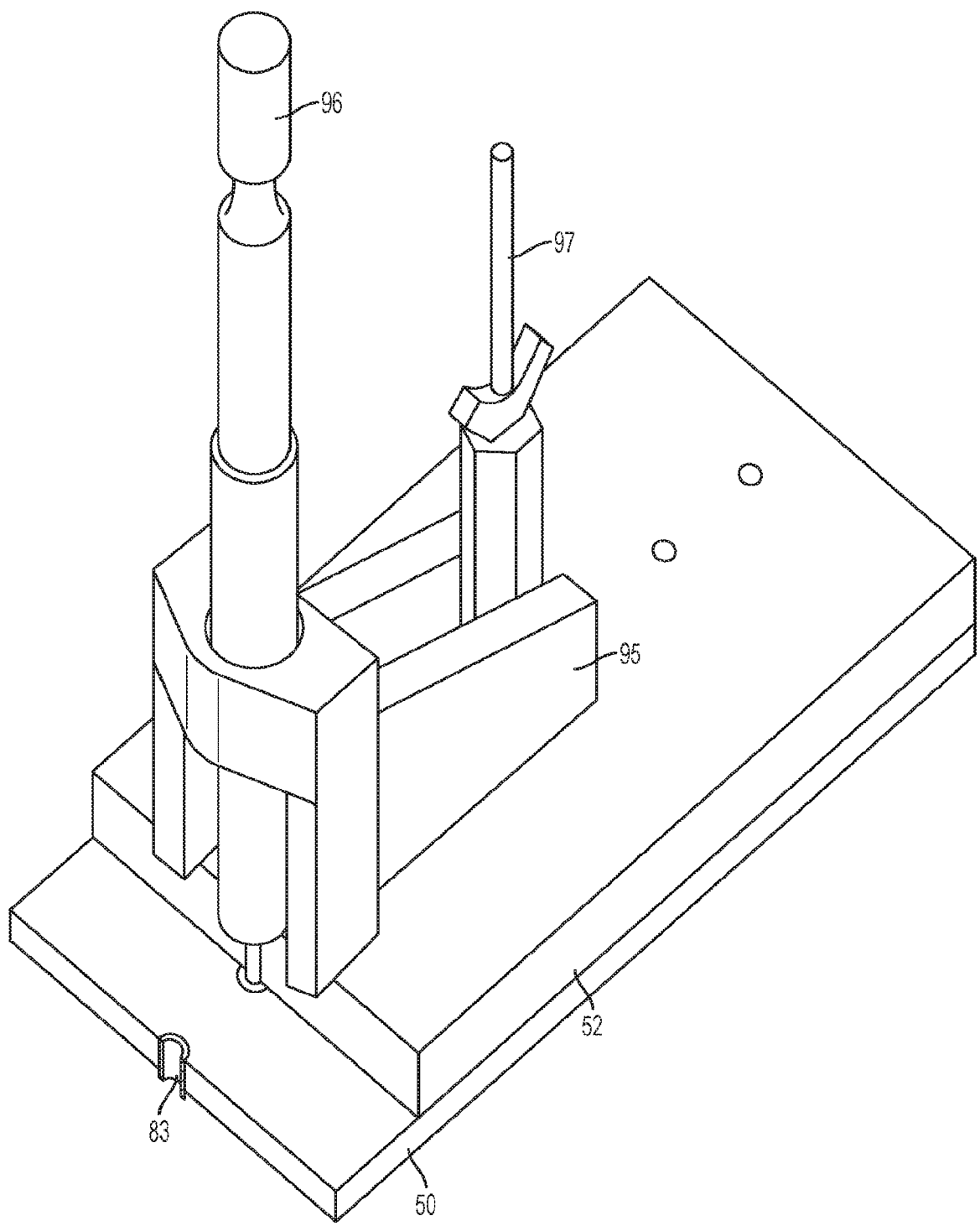
FIG. 8 is a perspective view of the components illustrated in FIG. 7.

According to various embodiments, a milling tool with a guide sized to the structure bushings (see FIGS. 6-8) may be utilized, so as to expand the wing skin hole and to center it on the structure hole. A guide fixture may be clamped into adjacent holes (see in particular FIGS. 7-8) to guide the milling tool. After all holes have been "centered" by the milling operation the skin is removed and the bushings are removed from the structure. The skin is then, according to various embodiments, re-mounted and the holes aligned using guide pins in representative holes to ensure accurate alignment prior to clamping. The skin holes that require flush head fasteners may, in certain embodiments, be countersunk prior to reaming. Thereafter, all holes are reamed to the final size, as detailed elsewhere herein, resulting in final hole sizes in both structure and skin that have controlled diameters for installation therein of close tolerance fasteners. In certain embodiments the fasteners have a ±0.0005 tolerance on the shank, equivalent to the shank tolerance for PLT154 JO-BOLTS, as commonly used in the aircraft industry. The final holes, upon reaming thereof as outlined above and described in further detail elsewhere herein, are sized in certain embodiments to provide a close fit of ±0.0005 nominal. Of course, in other embodiments varying degrees of tolerance and/or fit may be desirable, all as considered within the scope of the presently described inventive concept.

Because the method includes steps for finalizing the location of the fastener holes in the new wing skin by milling the fastener holes after the new wing skin has been positioned relative to the existing underlying wing structure, the method minimizes the number of potential sources of positional error when locating the fastener holes and thereby ensures that the position of the new wing skin relative to the existing underlying wing structure remains within acceptable tolerance parameters to provide a high-performance and safe repaired aircraft wing. Details surrounding each of the steps provided in the above summary will be provided, in turn, below.

Figure 1A:
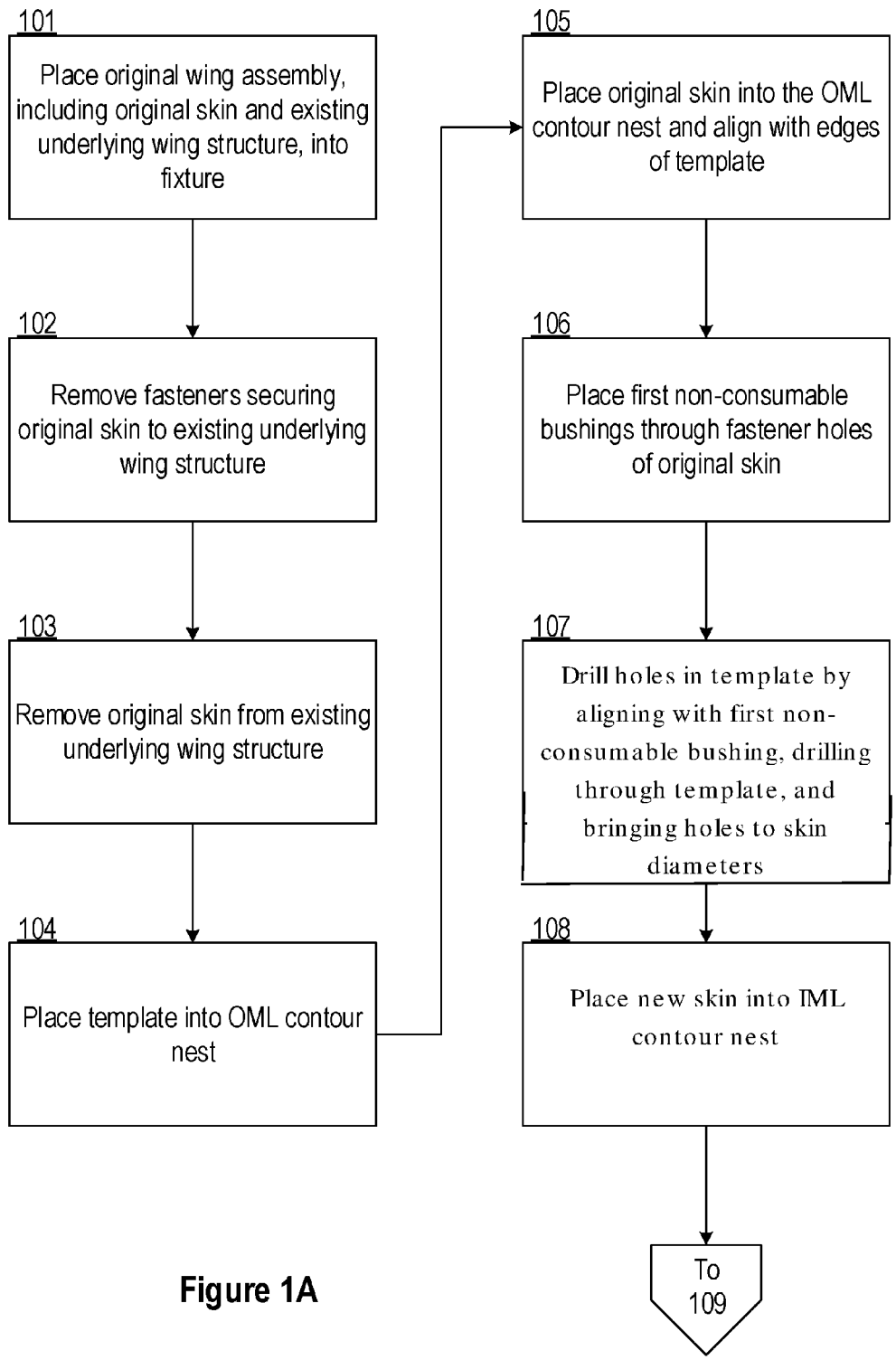
FIGS. 1A-1B include a flow chart illustrating example steps in a method for replacing an aircraft wing skin according to various embodiments.
Figure 1B:
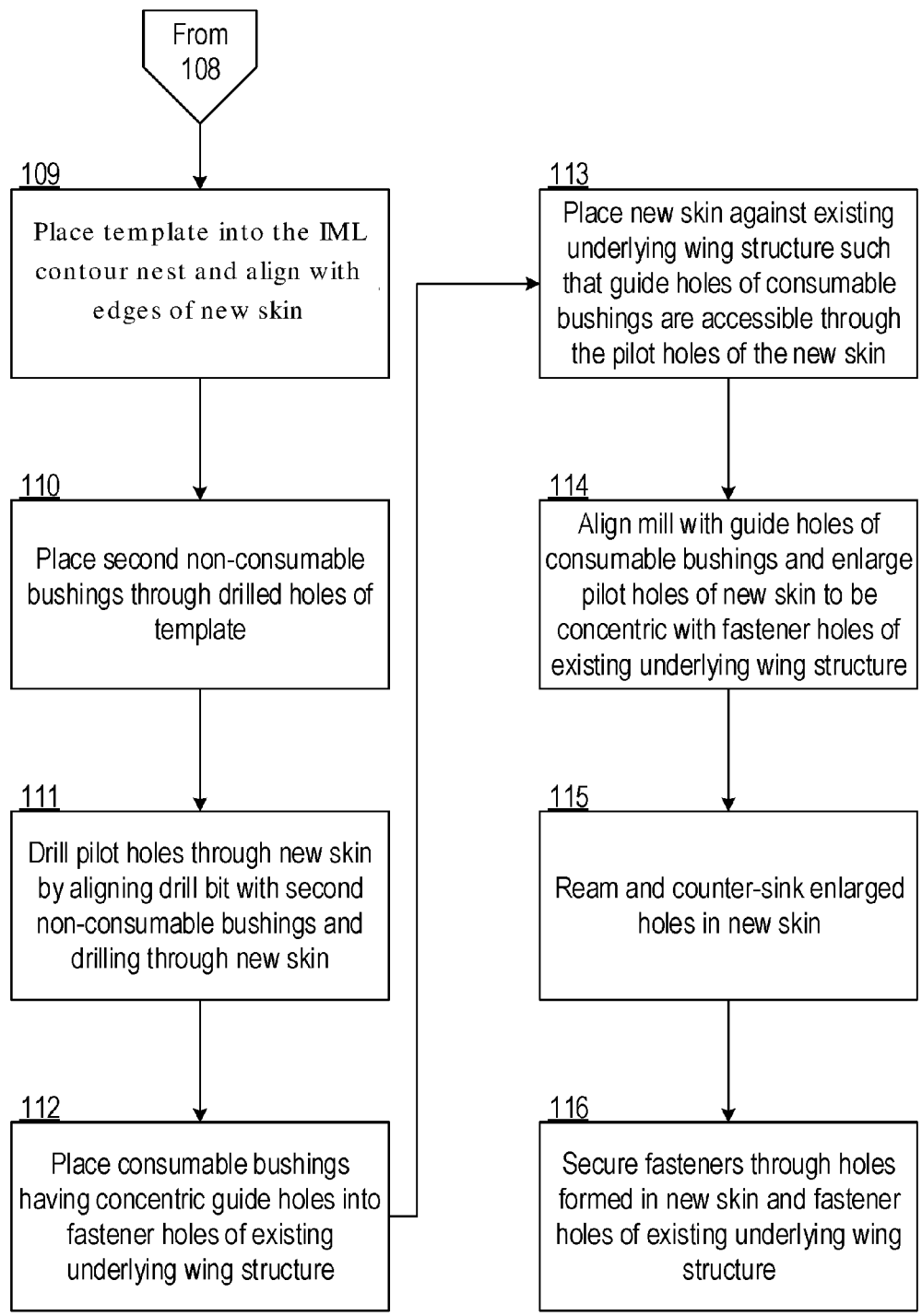

As a brief summary of the illustrations accompanying this text, FIGS. 1A-1B provide an overall flowchart of the process for replacing a wing skin, and FIGS. 2-6 provide illustrations of specific portions of an example method and the various components utilized therein. With this in mind and to provide a clear description of each of the procedures involved in such methodology, the following description has been divided into several discrete processes comprising: (1) preparation and disassembly of an original wing assembly; (2) production of a template; (3) formation of pilot holes in a new wing skin by utilizing the template; (4) milling the fastener holes into position in the new wing skin; and (5) reaming the fastener holes to final size. Such divisions of the overall methodology should not be construed as limiting. Indeed, in some embodiments, the inventive method may be practiced without performing all of the discrete processes outlined herein, for example where finishing of fastener holes may be deferred to another entity or a subsequent time.

1. Preparation and Disassembly of an Original Wing Assembly

Referring now to FIG. 1A, after removal of the original wing assembly from the aircraft, the original wing assembly is secured within a wing fixture 200 (see FIG. 2) at step 101. The original wing assembly may initially be loosely secured within the wing fixture 200 such that the original wing assembly may reach a steady-state temperature with the surrounding environment prior to fixedly securing each component relative to one another. By allowing the original wing assembly to reach a steady-state temperature, any potential thermal expansion of the materials utilized to form the original wing assembly may occur prior to tightly securing the original wing assembly within the wing fixture 200; such avoids any effects thereof adversely impacting alignment of any subsequently drilled holes, as described below.

Indeed, in various embodiments, the wing skin may comprise one or more materials that have different thermal expansion properties than the existing underlying wing structure 50 (as shown in FIG. 2), and accordingly allowing the original wing assembly to reach a steady-state temperature ensures that the original wing skin 51 (illustrated in part FIGS. 3A and 3B) does not move relative to the existing underlying wing structure 50 after securing the original wing assembly in the wing fixture 200. Ensuring that the wing is at a steady-state temperature prior to securing the wing into the wing fixture 200 minimizes the possibility of introducing errors into the process for replicating the fastener hole pattern of the original wing components on a new wing skin 52 (illustrated in part in FIGS. 4A-6).

With reference to FIG. 2, the wing fixture 200 may comprise a frame 201 (e.g., a steel and/or aluminum frame) configured to provide a stable support from which one or more bracket assemblies may extend to secure the wing in a vertical orientation without twisting and/or warping the wing. Accordingly, in various embodiments, the frame 201 may comprise extruded hollow square tubing having a high area moment of inertia, however any of a variety of cross-sectional shapes of the frame 201 may be utilizes (e.g., I-beam, triangular, round, and/or the like). Moreover, as shown in FIG. 2, the frame 201 may comprise one or more supports 202 configured to support the wing fixture 200 on a support surface. Although FIG. 2 shows the supports 202 as resting directly on the support surface, in various embodiments the supports 202 may rest on corresponding casters (e.g., locking casters) configured to permit the wing fixture 200 to be moved to alternative locations.

As previously noted, the wing fixture 200 may comprise a plurality of bracket assemblies configured to secure the wing within the wing fixture 200. In various embodiments, the plurality of bracket assemblies may be configured to be detachably secured to the wing while providing substantially unobstructed access to the wing skin 51, 52 and the plurality of fasteners used to secure the wing skin 51, 52 to the underlying wing structure 50.

As shown in FIG. 2, the wing may be supported at the base (trailing edge) of a fuselage attach rib (not numbered) via one or more base brackets 203. In various embodiments, the base brackets 203 may support more of the weight of the wing than the remaining brackets and hangers described in greater detail herein. In various embodiments, the base brackets 203 may be fastened to both the frame 201 and the wing via one or more fasteners (e.g., bolts). For example, the base brackets 203 may be secured to one or more existing fastener holes in the fuselage attach ribs. In various embodiments, the base brackets 203 may define an adjustable connection point at which a fastener extends from the base bracket 203 to the wing to accommodate different positions of existing fastener holes in the wing. Moreover, in various embodiments, the one or more base brackets 203 may comprise one or more dampers configured to accommodate small variations in the placement of the wing relative to the base brackets 203.

Moreover, as shown in FIG. 2, the wing fixture 200 may additionally comprise one or more base hangers 204 configured to support the top (leading edge) of the fuselage attach rib. Like the base brackets 203, the base hangers 204 may be fastened to both the frame 201 and the wing via one or more fasteners (e.g., bolts). For example, the base hangers 204 may be secured to one or more existing fastener holes in the fuselage attach ribs. In various embodiments, the base hangers 204 may define an adjustable connection point at which a fastener extends from the base hanger 204 to the wing to accommodate different positions of existing fastener holes in the wing. In various embodiments, the one or more base hangers 204 may each comprise one or more actuators to provide a length adjustment of the one or more base hangers 204 to ensure that the connection points at which the fasteners secure the base hangers 204 to the wing are properly located adjacent the wing. Accordingly, the one or more actuators may be provided to adjust the length of the one or more base hangers 204 to account for variations in the size of the wing.

Moreover, as shown in FIG. 2, the leading edge and trailing edge of the wing may be secured at one or more securing points by one or more wing hangers 205 and one or more wing brackets 206. As shown in FIG. 2, the one or more wing hangers 205 may be configured to engage the leading edge of the wing to secure the wing within the wing fixture 200. Like the base hangers 204 described above, the wing hangers 205 may be fastened to both the frame 201 and the wing via one or more fasteners (e.g., bolts). For example, the wing hangers 205 may be secured to one or more existing fastener holes in the leading edge of the wing. In various embodiments, the wing hangers 205 may define an adjustable connection point at which a fastener extends from the wing hanger 205 to the leading edge of the wing to accommodate different positions of existing fastener holes in the leading edge of the wing. In various embodiments, the one or more wing hangers 205 may each comprise one or more actuators to provide a length adjustment of the one or more wing hangers 205 to ensure that the connection points at which the fasteners secure the wing hangers 205 to the leading edge of the wing are properly located adjacent the leading edge of the wing. Accordingly, the one or more actuators may be provided to adjust the length of the one or more wing hangers 205 to account for variations in the size of the wing.

As shown in FIG. 2, the one or more wing brackets 206 may be configured to support the trailing edge of the wing to secure the wing within the wing fixture 200. Like the base brackets 203 described herein, the one or more wing brackets 206 may be fastened to both the frame 201 and the trailing edge of the wing via one or more fasteners (e.g., bolts). For example, the wing brackets 206 may be secured to one or more existing fastener holes in the trailing edge of the wing. In various embodiments, the wing brackets 206 may define an adjustable connection point at which a fastener extends from the wing bracket 206 to the wing to accommodate different positions of existing fastener holes in the wing. Moreover, in various embodiments, the one or more wing brackets 206 may comprise one or more dampers configured to accommodate small variations in the placement of the wing relative to the wing brackets 206.

As shown in FIG. 2, the wing fixture 200 may additionally comprise one or more wing tip brackets 207 configured to secure the wing tips within the wing fixture 200. In various embodiments, the wing tip brackets 207 may be fastened to both the frame 201 and the wing tips of the wing via one or more fasteners (e.g., bolts). For example, the wing tip brackets 207 may be secured to one or more existing fastener holes in the wing tips. In various embodiments, the wing tip brackets 207 may define an adjustable connection point at which a fastener extends from the wing tip bracket 207 to the wing tip to accommodate different positions of existing fastener holes in the wing. Moreover, in various embodiments, the one or more wing tip brackets 207 may comprise one or more dampers configured to accommodate small variations in the placement of the wing relative to the wing tip brackets 207.

Collectively, the plurality of brackets and hangers securely support the wing within the wing fixture 200 such that the wing is maintained in a generally vertical orientation and is prevented from substantially twisting, warping, bending, expanding, or otherwise deforming while secured within the wing fixture 200. Collectively, although the plurality of brackets and hangers configured to securely support the wing within the wing fixture 200 have been described as being fastened relative to the wing via one or more fasteners (e.g., bolts), any of a variety of securing mechanisms may be used, which may be selectively removable and/or isolation or dampening providing, so as to isolate the wing from any external environmental influences upon securing thereof to the fixture.

Referring again to FIG. 1A, after the wing is secured within the wing fixture 200, the fasteners securing the original wing skin 51 to the existing underlying wing structure 50 are removed at step 102. For example, the fasteners may be removed via an electronic discharge or electrostatic drill ("E-drill"). In various embodiments, the E-drill is positioned over the head of each fastener to be removed, and the E-drill emits a high intensity electrical current into the head of the fastener to cut the head of the fastener. The E-drill may be configured to cut a circular channel into the head of the each fastener that is substantially concentric with the head of each fastener. The circular channel may have a diameter slightly larger than the diameter of the shank of the fastener, and may have a depth slightly less than the depth of the head of the fastener, such that the heads of the fasteners may be sheared away from the corresponding shanks of the fasteners with minimal force after cutting the head of the fasteners by the E-drill. By cutting a channel through the heads of the fasteners, the removal process minimizes the possibility of damaging the original wing skin 51 and/or the existing underlying wing structure 50. However, any of a variety of techniques may be utilized to remove the fasteners, including drilling the heads of the fasteners, and/or the like.

Once all of the fasteners securing the original wing skin 51 to the existing underlying wing structure 50, the original wing skin 51 is removed from the existing underlying wing structure 50 at step 103. The removal process may be facilitated by the use of one or more cranes and/or other support mechanisms configured to support the weight of the original wing skin 51 without damaging the original wing skin 51. The original wing skin 51 may then be guided away from the wing fixture 200 and the existing underlying wing structure 50 for additional processing.

2. Production of a Skin Template

After removal of the original wing skin 51 from the wing, the original wing skin 51 may be utilized to generate a skin template 61 (as shown in FIGS. 3A-4B) that may be used to replicate the fastener hole pattern of the original wing skin 51.

As illustrated at step 104 shown in FIG. 1A, a blank skin template is placed into a concave Outer Mold Line (OML) contour nest 71 (as shown in FIG. 3A) configured to support the skin template 61 and the original wing skin 51 in a configuration that substantially replicates the wind swept contour of the wing. The skin template 61 may be produced while positioned in the OML contour nest 71 in order to minimize the possibility of any hole misalignment due to contour parallax that may occur while aligning the original wing skin 51 with the skin template 61. Moreover, in certain embodiments, the OML contour nest 71 may comprise a material substantially the same as the skin template 61 and the wing skin 51 in order to minimize any potential misalignment that may be the result of differences in thermal expansion rates of materials. For example, for an aluminum wing skin, the OML contour nest 71 may comprise aluminum. Similarly, in such configurations, the skin template 61 may also comprise aluminum.

Of course, in other various embodiments, the material of the OML contour nest 71 need not be the same as that of the skin template 61 and/or the wing skin 51; for example, the contour nest may be made of wood. In these and still other embodiments, it should be understood that since the skin template 61 and the wing skin 51 are merely resting in the OML contour nest 71, the nest itself is not sensitive to thermal excursions for purposes of hole alignment, as are the skin template and the wing skin. Thus, according to various embodiments the nest may be a low-precision component and may accordingly be made of any material, for example wood. Only the template and the wing skin need be made of matching materials, as detailed above, as it is necessary for the wing skin and the template to follow each other during daily thermal cycles (expansion and/or contraction and/or the like). In this respect, it should also be understood that steady-state temperature is not required; however, the temperature characteristics of the wing skin and the template should be similar.

After the skin template 61 is placed in (i.e., permitted to rest in) the OML contour nest, the original wing skin 51 is placed onto the skin template 61 and aligned with the edges of the skin template 61 at step 105 of FIG. 1A. In various embodiments, the original wing skin 51 is placed onto the skin template 61 such that an exterior surface of the original wing skin 61 (corresponding to the visible surface of the wing skin when installed relative to the underlying wing structure 50) is adjacent a first surface of the skin template 61. In various embodiments, the skin template 61 may be generated having a perimeter shape that corresponds to the perimeter shape of the wing skin, and complies with any acceptable tolerances of the wing skin (e.g., tolerances regarding the lengths of each segment of the perimeter). This may assist with initial alignment of the skin template 61 relative to the underlying wing structure 50 prior to securing of the same relative to one another.

In that regard, in various embodiments, the skin template 61, the original wing skin 51, and the OML contour nest 71 may also be permitted to reach a similar (or same or even steady-state) temperature/condition prior to securing at least the skin template and the original wing skin together such that any thermal changes over time of these two components occur prior to them being secured relative to one another; notably, this permits the skin and the template to breathe (i.e., expand, contract, and/or the like) in unison. After the skin template 61 and the original wing skin 51 reach a similar temperature, these components may only then be detachably clamped (or otherwise secured, even if in an isolation or dampening-like manner) relative to one another to prevent relative movement of these components. FIG. 3A illustrates an example configuration of an original wing skin 51 secured relative to a skin template 61, with both components resting in the OML contour nest 71. It should be reiterated in this respect that neither the original wing skin 51 nor the skin template 61 are secured to the OML contour nest 71. In this manner, according to certain embodiments, the nest need not be thermally controlled or monitored, although such may be advantageous in other embodiments.

FIG. 3B illustrates a close-up view of the original wing skin 51 while a corresponding hole is formed in the skin template 61. With reference to FIG. 3B, after the original wing skin 51 and the skin template 61 are secured (e.g., clamped) relative to one another and permitted to rest (e.g., not clamped) in the OML contour nest 71, a first non-consumable bushing 81 is placed through each fastener hole of the original wing skin 51 which is configured to guide a drill bit 91 through the fastener hole to maintain a desired drill bit orientation while forming a corresponding hole in the skin template 61 (at step 106 of the process illustrated in FIG. 1A). In certain embodiments the bushing 81 may be non-consumable, meaning that no portion of the bushing is damaged during the drilling process, as described elsewhere herein. In this context, non-consumable is meant to be construed such that the bushing 81 may be reusable. Of course, in other embodiments, it may be possible to have consumable bushings, in that such may be discarded upon a single use thereof. Preferably, however, even in such and still other embodiments, the consumable type bushings would not be damaged during the drilling process, so as to ensure concentricity is maintained.

As shown in FIG. 3B, the first non-consumable bushing 81 may have an outer diameter configured to fit tightly within the fastener hole of the original wing skin 51. In various embodiments, the outer diameter of the first bushing 81 may be produced with a tight tolerance in order to minimize the error of positioning holes corresponding to each fastener hole in the skin template 61. Moreover, by providing a tight fit between the fastener hole of the original wing skin 51 and the outer diameter of the first bushing 81, the first bushing is substantially prevented from pivoting relative to the original wing skin 51, such that the first bushing remains properly aligned within the fastener hole of the original wing skin 51. Of course, in other embodiments, such a tight fit may not be necessary, provided the bushing fits relatively snugly within the fastener hole so as to avoid any "wobbling" thereof during drilling there-through, as described elsewhere herein.

Moreover, the first bushing 81 may define a concentric hole extending there-through. In various embodiments, the placement of the concentric hole relative to the first bushing 81 may have a tight tolerance regarding the concentricity of the hole along the entire length of the first non-consumable bushing 81, again to minimize the error of positioning holes corresponding to each fastener hole in the skin template 61. As shown in FIG. 3B, the diameter of the hole of the first non-consumable bushing 81 is smaller than the outer diameter of the first bushing 81, and corresponds to the diameter of the drill bit 91 utilized to form a corresponding hole in skin template 61. The diameter of the drill bit 91 may be negligibly smaller than the hole of the first bushing 81 such that the drill bit 91 is permitted to slide along the length of the hole of the bushing 81 without substantially pivoting relative to the length of the hole of the bushing 81. Accordingly, the drill bit 91 remains substantially concentric with the hole of the bushing 81 along the entirety of the length of the hole of the bushing 81 while the drill bit 91 is passing there-through, such that the drill bit 91 forms a hole through the skin template 61 substantially parallel to and concentric with the corresponding fastener hole of the original wing skin 51 (during step 107 of the process illustrated in FIG. 1A). This process may be repeated for all fastener holes extending through the original wing skin 51. The resulting skin template 61 defines holes corresponding to each of the fastener holes of the original wing skin 51, and each of the holes extending through the skin template 61 has a diameter smaller than the corresponding fastener holes of the original wing skin 51.

During formation of holes in the skin template 61 corresponding to the fastener holes of the original wing skin 51, several potential sources of error in the positioning of the corresponding holes is minimized as a result of the above process. Positioning errors that may result from differences in thermal expansion between the original wing skin 51 and the skin template 61 are minimized by allowing each of these components to reach a similar temperature prior to the components being secured relative to one another. Moreover, positioning errors that may result from misalignment of the original wing skin 51 relative to the skin template 61 are minimized by aligning these components relative to one another with a tight tolerance of acceptable variations in positioning relative to one another. Positional errors that may result from possible contour parallax (e.g., resulting from overlaying two surfaces designed to be in a slightly curved configuration) are minimized by drilling the corresponding holes through the skin template 61 while the skin template 61 and the original wing skin 51 are secured to each other while both are resting (not clamped) within the OML contour nest 71.

Still further, possible errors resulting from misalignment of the drill bit 91 relative to the fastener holes of the original wing skin 51 are minimized by placing first bushings 81 manufactured with tight manufacturing tolerances (e.g., to the outer diameter, concentricity of the hole extending through the bushing, diameter of the hole extending through the busing, and/or the like) and sliding the drill bit 91 through the hole extending through the first bushing 81 while drilling through the skin template 61. The resulting skin template 61 which is generated having tight tolerances regarding the locations of the holes corresponding to the fastener holes of the original wing skin 51 may then be utilized to form pilot holes though a new wing skin.

According to various embodiments, as outlined above, pilot holes are drilled in the template by drilling from the back of the original skin through bushing inserted in the original skin. In certain embodiments, prior to transfer of the template to the new skin, the pilot holes may be first brought to the original skin hole size by using a piloted drill through the old skin. Notably, in these and other embodiments, the piloting occurs first, so as to ensure concentricity and creation of an accurate hole vector (position and angle) prior to enlarging the template holes.

3. Formation of Pilot Holes in New Wing Skin

Referring again to FIG. 1A, the sub process of forming pilot holes thorough the new wing skin 52 (shown in FIGS. 4A-4B) begins at step 108, when the new wing skin 52 is placed into a convex Inner Mold Line (IML) contour nest 72. Like the OML contour nest 71 used to support the original wing skin 51 and the skin template 61 during drilling of the holes through the skin template, the IML contour nest 72 supports the new wing skin 52 and the skin template 61 in a configuration that substantially replicates the wind swept contour of the wing. The pilot holes may be drilled into the new wing skin 52 while positioned (i.e., resting, not clamped) in the IML contour nest 72 in order to minimize the possibility of any hole misalignment due to contour parallax that may occur while aligning the skin template 61 with the new wing skin 52. Moreover, in certain embodiments, the IML contour nest 72 may comprise a material substantially the same as (or at least having the same thermal material characteristics as) the skin template 61 and wing skin in order to minimize any potential misalignment that may be the result of differences in thermal expansion rates of materials. For example, for an aluminum wing skin, the IML contour nest 72 may be made likewise of aluminum (or a material having the same thermal material characteristics as aluminum or a material having a negligibly different thermal material characteristics as aluminum, however as may be desirable or acceptable depending upon an acceptable tolerance level, as may be predetermined).

Of course, in other various embodiments, the material of the IML contour nest 72 need not be the same as that of the skin template 61 and/or the wing skin 52; for example, the contour nest may be made of wood. In these and still other embodiments, it should be understood that since the skin template 61 and the wing skin 52 are merely resting in the IML contour nest 72, the nest itself is not sensitive to thermal excursions for purposes of hole alignment, as are the skin template and the wing skin. Thus, according to various embodiments the nest may be a low-precision component and may accordingly be made of any material, for example wood. Only the template and the wing skin need be made of matching materials, as detailed above, as it is necessary for the wing skin and the template to follow each other during daily thermal cycles (expansion and/or contraction and/or the like). In this respect, it should also be understood that steady-state temperature is not required; however, the temperature characteristics of the wing skin and the template should be similar.

Continuing to step 109 shown in FIG. 1B, the skin template 61 is placed over the new wing skin 52 and the edges of the skin template 61 are aligned with the edges of the new wing skin 52 after the new wing skin 52 is placed in the IML contour nest 72. In various embodiments, the skin template 61 is placed onto the new wing skin 52 such that the first surface of the skin template 61 (the surface that was adjacent the exterior surface of the original wing skin while the holes were drilled into the skin template) is adjacent the exterior surface of the new wing skin 52. The new wing skin 52 may be generated having a perimeter shape that complies with applicable acceptable tolerances for the manufacture of the wing skin (e.g., size, orientation of various segments of the perimeter, the thickness of the wing skin, and/or the like).

In various embodiments, the skin template 61 and the new wing skin 52 may also be permitted to reach a similar or same or even steady-state temperature prior to securing these components together such that any thermal changes over time occur prior to the components being secured relative to one another; notably, this permits the skin and the template to breathe (i.e., expand, contract, and/or the like) in unison. After the IML contour nest 72, the skin template 61, and the new wing skin 52 reach at least a similar temperature, these components are detachably clamped (or otherwise secured, even if in an isolation or dampening-like manner) relative to one another to prevent relative movement of these components. FIG. 4A illustrates an example configuration of a new wing skin 52 secured relative to the skin template 61 and the IML contour nest 72.

Figure 4B:
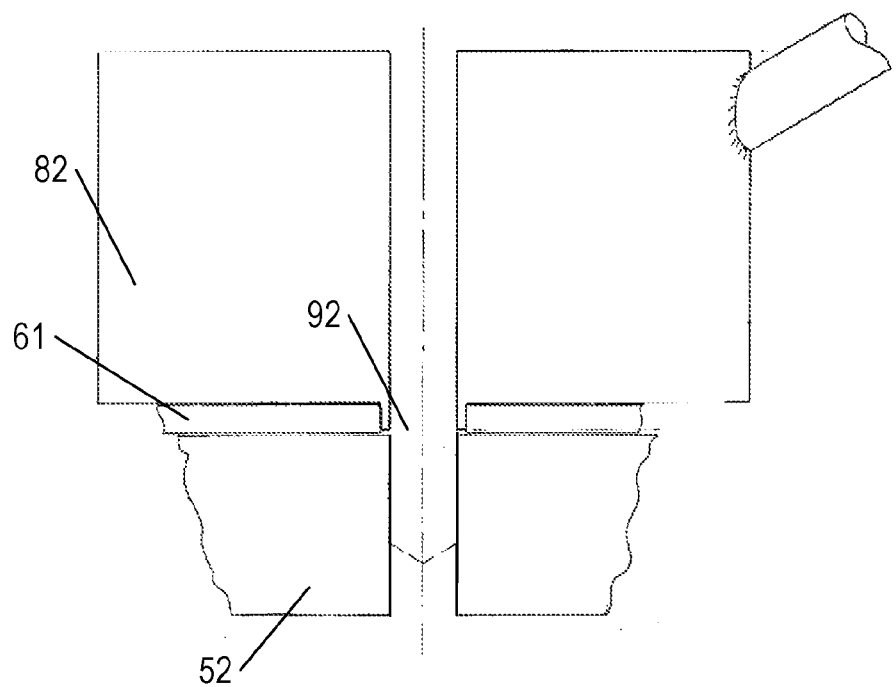

FIG. 4B illustrates a close-up view of the skin template 61 while a corresponding pilot hole is formed in the new wing skin 52. With reference to FIG. 4B, after the skin template 61 and the new wing skin 52 are placed (i.e., resting without clamping thereof) in the IML contour nest 72, a second non-consumable bushing 82 is placed through each hole of the skin template 61 which is configured to guide a drill bit through the hole of the skin template 61 to maintain a desired drill bit orientation while forming a corresponding pilot hole in the new wing skin 52 (at step 110 of the process illustrated in FIG. 1B). In certain embodiments the second bushing 82 may be non-consumable in a fashion analogous to that of the first bushing 81, as described previously herein. In other embodiments, however, the second bushing 82 (and/or the first bushing 81) may be consumable in nature.

As shown in FIG. 4B, the second non-consumable bushing 82 may have an outer diameter configured to fit tightly within the hole of the skin template 61. In various embodiments, the outer diameter of the second bushing 82 may be produced with a tight tolerance in order to minimize the error of positioning the pilot holes in the new wing skin 52 corresponding to each hole in the skin template 61. Moreover, by providing a tight fit between the hole of the skin template 61 and the outer diameter of the second bushing 82, the second bushing is substantially prevented from pivoting relative to the skin template 61, such that the second bushing 82 remains properly aligned within the hole of the skin template 61. Of course, in other embodiments, such a tight fit may not be necessary, provided the bushing fits relatively snugly within the fastener hole so as to avoid any "wobbling" thereof (which could result in improper alignment) during drilling there-through, as described elsewhere herein.

Moreover, the second non-consumable bushing 82 may define a concentric hole extending there-through. In various embodiments, the placement of the concentric hole relative to the second bushing 82 may have a tight tolerance regarding the concentricity of the hole along the entire length of the second bushing 82, again to minimize the error of positioning pilot holes in the new wing skin 52 corresponding to each hole of the skin template 61. As shown in FIG. 4B, the diameter of the hole of the second bushing 82 is smaller than the outer diameter of the second bushing 82, and corresponds to the diameter of the drill bit 92 utilized to form a corresponding pilot hole in new wing skin 52. The diameter of the drill bit 92 may be negligibly smaller than the hole of the second bushing 82 such that the drill bit 92 is permitted to slide along the length of the hole of the second bushing 82 without substantially pivoting relative to the length of the hole of the second bushing 82. Accordingly, the drill bit 92 remains substantially concentric with the hole of the second bushing 82 along the entirety of the length of the hole of the second bushing 82 while the drill bit 92 is passing there-through, such that the drill bit 92 forms a pilot hole through the new wing skin 52 substantially parallel to and concentric with the corresponding hole of the skin template 61 (during step 111 of the process illustrated in FIG. 1B).

The above-described process may be repeated for all holes extending through the skin template 61. As a result, the new wing skin 52 defines pilot holes corresponding to each of the holes of the skin template 61, and accordingly, includes pilot holes corresponding to each of the fastener holes of the original wing skin 51. Moreover, because the drill bits 91, 92 used to form holes in the skin template 61, and subsequently in the new wing skin 52 are progressively smaller (such that the drill bits 91, 92 may slide through concentric holes of the corresponding non-consumable bushings 81, 82), the resulting pilot holes in the new wing skin 52 are smaller than the original fastener holes of the original wing skin 51, and smaller than the corresponding holes of the skin template 61.

During formation of holes in the new wing skin 52 corresponding to the holes of the skin template 61, several potential sources of error in the positioning of the corresponding holes are notably minimized (and/or substantially avoided) as a result of the above process. However, as described in greater detail herein, the error is not eliminated entirely, due to variations in the positioning of the various components relative to one another (e.g., the skin template 61 and the new wing skin 52) and due to variations in the manufacture of various components (e.g., the size of the skin template 61 may vary within acceptable tolerance limits, the size of the new wing skin 52 may vary within acceptable tolerance limits, the dimensions of the non-consumable bushings 81, 82 may vary within acceptable tolerance limits, and/or the like). However, positioning errors that may result from differences in thermal expansion between the new wing skin 52, the skin template 61, and/or the IML contour nest 72 (at a minimum at least between the skin and the template) are minimized by allowing each of these components to reach at least a similar temperature prior to the components being secured relative to one another. Moreover, positioning errors that may result from misalignment of the skin template 61 relative to the new wing skin 52 are minimized by aligning these components relative to one another with a tight tolerance of acceptable variations in positioning relative to one another. Positional errors that may result from possible contour parallax (e.g., results resulting from overlaying two surfaces designed to be in a slightly curved configuration) are minimized by drilling the corresponding pilot holes through the new wing skin 52 while the skin template 61 and the new wing skin 52 are positioned or resting (i.e., without clamping) within the IML contour nest 72. Possible errors resulting from misalignment of the drill bit 92 relative to the holes of the skin template 61 are minimized by placing second non-consumable bushings 82 manufactured with tight manufacturing tolerances (e.g., to the outer diameter, concentricity of the hole extending through the bushing, diameter of the hole extending through the busing, and/or the like) and sliding the drill bit 92 through the hole extending through the second non-consumable bushing 82 while drilling pilot holes through the new wing skin 52.

Due to the tight tolerances involved in first drilling holes in the skin template 61 and then drilling the pilot holes in the new wing skin 52, however, the resulting pilot holes of the new wing skin 52 are within an acceptable tolerance of the corresponding original location of the fastener holes of the original wing skin 51. Accordingly, as will be described in greater detail herein, when the new wing skin 52 is placed against the existing underlying wing structure, the pilot holes of the new wing skin 52 at least partially overlap the fastener holes of the existing underlying wing structure. While errors in the positioning of the pilot holes in the new wing skin 52 during the process of transferring the fastener hole pattern from the original wing skin 51 to the skin template 61 and subsequently to the new wing skin 52 (within acceptable tolerance limits) may have caused the pilot holes of the new wing skin 52 to be eccentric of the fastener mounting holes of the existing underlying wing structure, as noted, the pilot holes of the new wing skin 52 overlap the fastener mounting holes of the existing underlying wing structure.

4. Finalizing the Fastener Hole Positions in the New Wing Skin

Referring again to FIG. 1B, the pilot holes of the new wing skin 52 are expanded to correspond to the diameter of the fastener holes of the original wing skin 51, and the resulting fastener holes of the new wing skin 52 are finished through steps beginning at step 112.

Figure 5A:
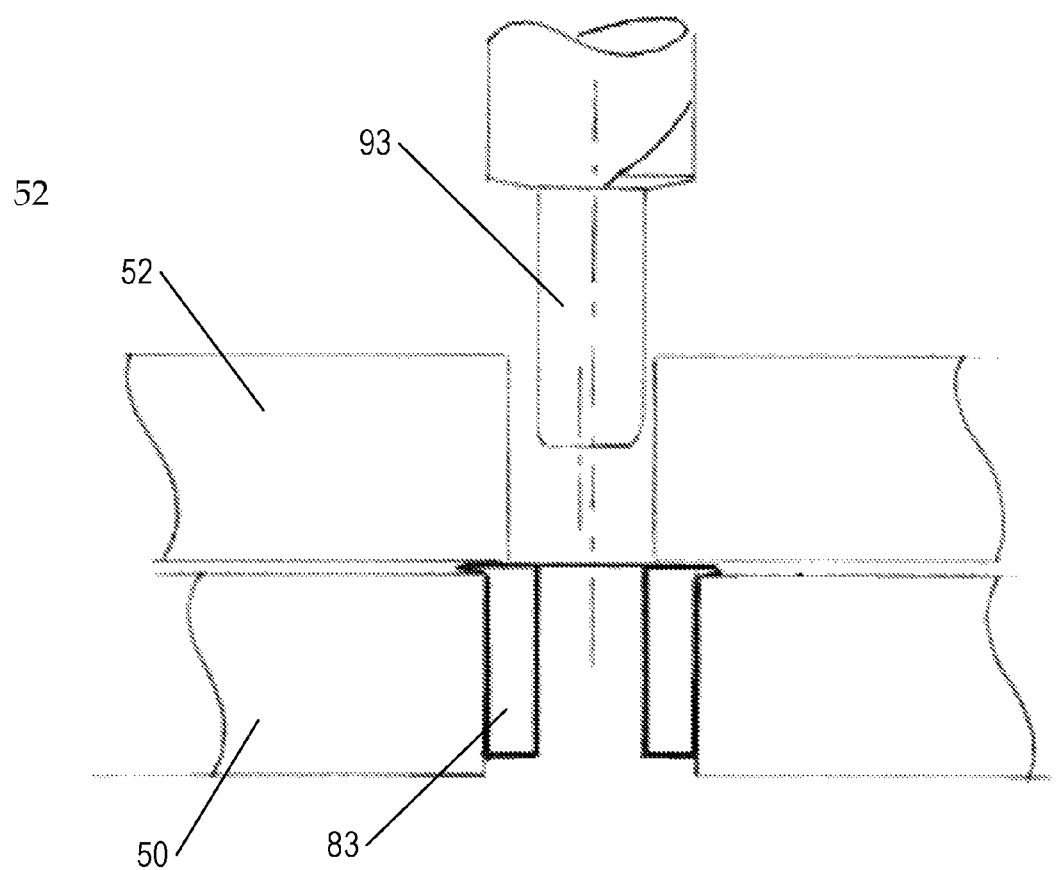
FIG. 5A illustrates exemplary milling tooling used to mill the pilot holes drilled in the new wing skin so as to align such with existing holes in an existing underlying wing structure.
Figure 6:
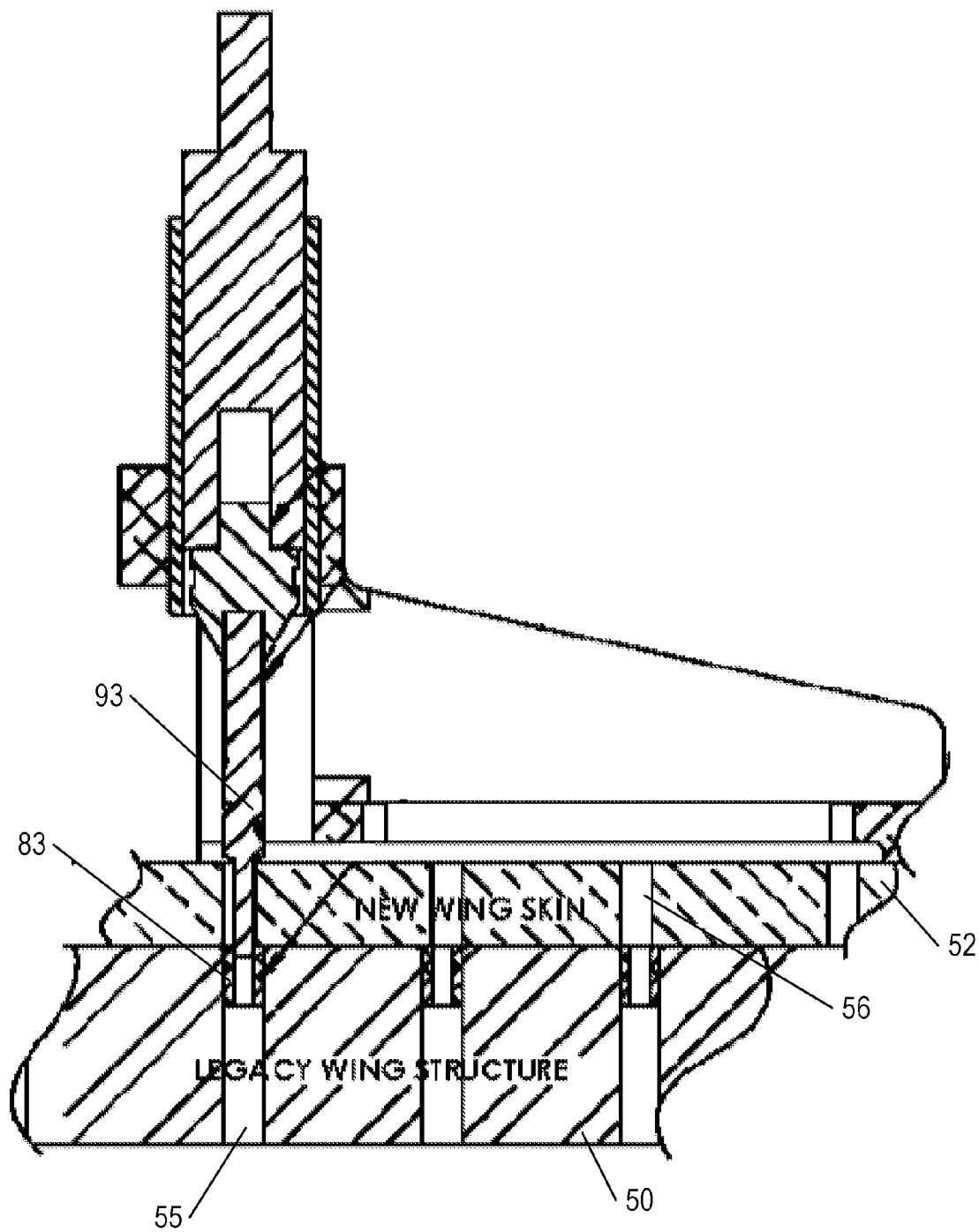
FIG. 6 shows the relative positioning of various components utilized according to one embodiment in milling/finishing/reaming the fastener holes of the new wing skin while such is positioned over the existing underlying wing structure.

Prior to placement of the new wing skin 52 relative to the existing underlying wing structure 50, consumable bushings 83 (as shown in FIGS. 5A and 6) are placed in each of the fastener holes 55 of the existing underlying wing structure 50. As described in detail herein, these consumable bushings 83 are configured to guide a mill bit 93 to align with a center point of the corresponding fastener hole 55 of the existing underlying wing structure 50. Due to their consumable nature, it should be understood that the bushings 83 are configured according to certain embodiments to permit the mill bit 93 to cut away at least a portion of each bushing 83 as the corresponding hole drilled through the new wing skin 52 is widened.

In various embodiments, the consumable bushing 83 may have an outer diameter configured to fit tightly within a corresponding fastener hole 55 of the existing underlying wing structure 50. In various embodiments, the outer diameter of the consumable bushing 83 may be produced with a tight tolerance in order to minimize the error of locating the absolute center of the fastener hole 55 of the existing underlying wing structure 50. Moreover, by providing a tight fit between the fastener hole 55 of the existing underlying wing structure 50 and the outer diameter of the consumable bushing 83, the consumable bushing 83 is substantially prevented from pivoting relative to the existing underlying wing structure 50, such that the consumable bushing 83 remains properly aligned within the fastener hole 55 of the existing underlying wing structure 50.

Moreover, the consumable bushing 83 may define a concentric guide hole extending therethrough. In various embodiments, the placement of the concentric guide hole relative to the consumable bushing 83 may have a tight tolerance regarding the concentricity of the guide hole along the entire length of the consumable bushing 83, again to minimize the error of locating the absolute center point of the fastener holes 55 of the existing underlying wing structure 50. In various embodiments, the diameter of the guide hole of the consumable bushing 83 is smaller than the outer diameter of the consumable bushing 83 and smaller than the diameter of the pilot holes 56 (as shown in FIG. 6) of the new wing skin 52, and corresponds to the diameter of a mill bit 93 utilized to mill the pilot holes 56 of the new wing skin 52 to the appropriate diameter corresponding to the diameter of the fastener holes 55 of the existing underlying wing structure 50. As will be described in greater detail herein, the diameter of the mill bit 93 may be negligibly smaller than the guide hole of the consumable bushing 83 such that the mill bit 93 is permitted to slide into an initial position concentric with the fastener hole 55 of the existing underlying wing structure 50 prior to beginning the milling process.

Moreover, in various embodiments, the consumable bushing 83 may comprise a thin flange extending around a perimeter of the bushing 83 at a first end of the bushing. In various embodiments, the thin flange has a diameter larger than the outer diameter of the consumable bushing 83, and may be at least substantially concentric with the consumable bushing 83. The thin flange may have any of a variety of shapes, including circular, square, rectangular, triangular, regular polygonal shape, irregular polygonal shape, non-polygonal two-dimensional shape, and/or the like. The thin flange may be configured to prevent the consumable bushing 83 from sliding through the fastener hole 55 of the existing underlying wing structure 50, and accordingly any of a variety of shapes and/or configurations may be utilized having at least one dimension larger than the diameter of the consumable bushing 83 and the fastener holes 55 of the existing underlying wing structure 50.

Referring again to FIG. 1B, after the consumable bushings 83 are placed in the fastener holes 55 of the existing underlying wing structure 50, the new skin 52 is aligned with the existing underlying wing structure 50 at step 113. FIGS. 5A and 6 illustrate a configuration having a new wing skin 52 aligned relative to the existing underlying wing structure 50. As shown in FIGS. 5A and 6, when the new wing skin 52 is aligned relative to the existing underlying wing structure 50 within acceptable tolerance limits (e.g., corresponding to the positioning of the edges of the new wing skin 52 relative to the existing underlying wing structure 50), the entirety of the guide hole of the consumable bushing 83 corresponding to each fastener hole 55 of the existing underlying wing structure 50 is accessible through the corresponding pilot holes 56 of the new wing skin 52. Moreover, the entirety of the pilot hole is positioned within an imaginary circle existing on the new wing skin 52 having a perimeter aligned with a perimeter of the corresponding fastener hole of the existing underlying wing structure 52. Accordingly, as described in greater detail below, when the pilot hole 56 is milled to a diameter to form a fastener hole in the new wing skin 52, material is milled from the new wing skin 52 around the entire perimeter of the pilot hole 56, such that no portion of the corresponding pilot hole 56 overlaps with a perimeter of the formed fastener hole 55 of the new wing skin 52. Thus, as described in greater detail herein, after milling the fastener hole, the perimeter of the fastener hole formed in the new wing skin 52 is formed entirely during the milling process, rather than the drilling process utilized to form the corresponding pilot hole 56 (described in detail herein). Thus, any error introduced in the positioning of the pilot hole 56 is "washed out" by the formation of the fastener hole.

This configuration results from the tight tolerances corresponding to the positioning of the holes in the skin template 61 and the pilot holes 56 of the new wing skin 52 and the tight tolerances of the positioning of the guide holes of the consumable bushings 83. Accordingly, the diameter and tolerances of the guide hole of the consumable bushing 83 is sized such that, considering the possible error in the positioning of the pilot holes relative to the corresponding fastener holes of the existing underlying wing structure, the entirety of the guide hole of the consumable bushing 83 is accessible through the pilot hole of the new wing skin 52, even in instances in which the possible error between the location and size of the pilot hole 56 and the guide hole of the consumable bushing 83 is at a maximum, as determined based on the acceptable tolerances through each processing step described herein for generating the pilot holes in the new wing skin 52 and for manufacturing the consumable bushing 83.

After the new wing skin 52 is placed against the existing underlying wing structure 50, a mill bit 93 is aligned with the guide holes of the consumable bushings 83 at step 114 (of FIG. 1B). As shown in FIGS. 5A and 6, the mill bit 93, which is secured within and operated by a mill, is positioned within the guide hole of the consumable bushing 83. In various embodiments, the mill bit may have an elongate end that is tapered, so as to provide an incremental milling result relative to the consumable bushings 83. Still further, in certain embodiments the mill bit 93 may be secured to the wing assembly by securing a mill fixture 95, a stability bushing 96, and a drawing clamp 97 (e.g., a deco, or the like, as commonly known and understood in the aircraft industry) (all collectively "a guide mechanism") relative to adjacent fastener holes (see FIG. 7 in particular; also FIG. 8). Because the guide hole of the consumable bushing 83 is positioned centrally relative to the fastener hole of the existing underlying wing structure 50 and because the mill bit 93 is negligibly smaller than the interior diameter of the guide hole of the consumable bushing 83, the mill bit 93 may thus be determined to be aligned with a center point of the fastener hole 55 of the existing underlying wing structure 50, and accordingly is located concentric to the fastener hole 55 of the existing underlying wing structure 50 within an acceptable tolerance. Beginning from this initial position at which the mill bit 93 is positioned within the guide hole of the consumable bushing 83, the mill bit 93 may be operated to enlarge the pilot hole 56 of the new wing skin 52 such that it is concentric with the fastener hole of the existing underlying wing structure 50 and has a diameter substantially the same as the diameter of the fastener hole of the existing underlying wing structure 50. As the pilot hole 56 is milled, the consumable bushing 83 is concurrently milled to enlarge the guide hole such that it is negligibly smaller than the outside diameter of the consumable bushing 83. The remaining material between the interior diameter of the guide hole and the outside diameter of the consumable bushing 83 is sufficiently thin that it shears with little force such that the thin flange of the consumable bushing 83 falls away from between the new wing skin 52 and the existing underlying wing structure 50. This process of positioning the mill bit 93 within a guide hole of a consumable bushing 83 and milling the corresponding pilot hole to be substantially concentric with the corresponding fastener hole of the existing underlying wing structure 50 may be repeated for each of the pairs of pilot holes and fastener holes of the existing underlying wing structure 50.

Figure 5B:
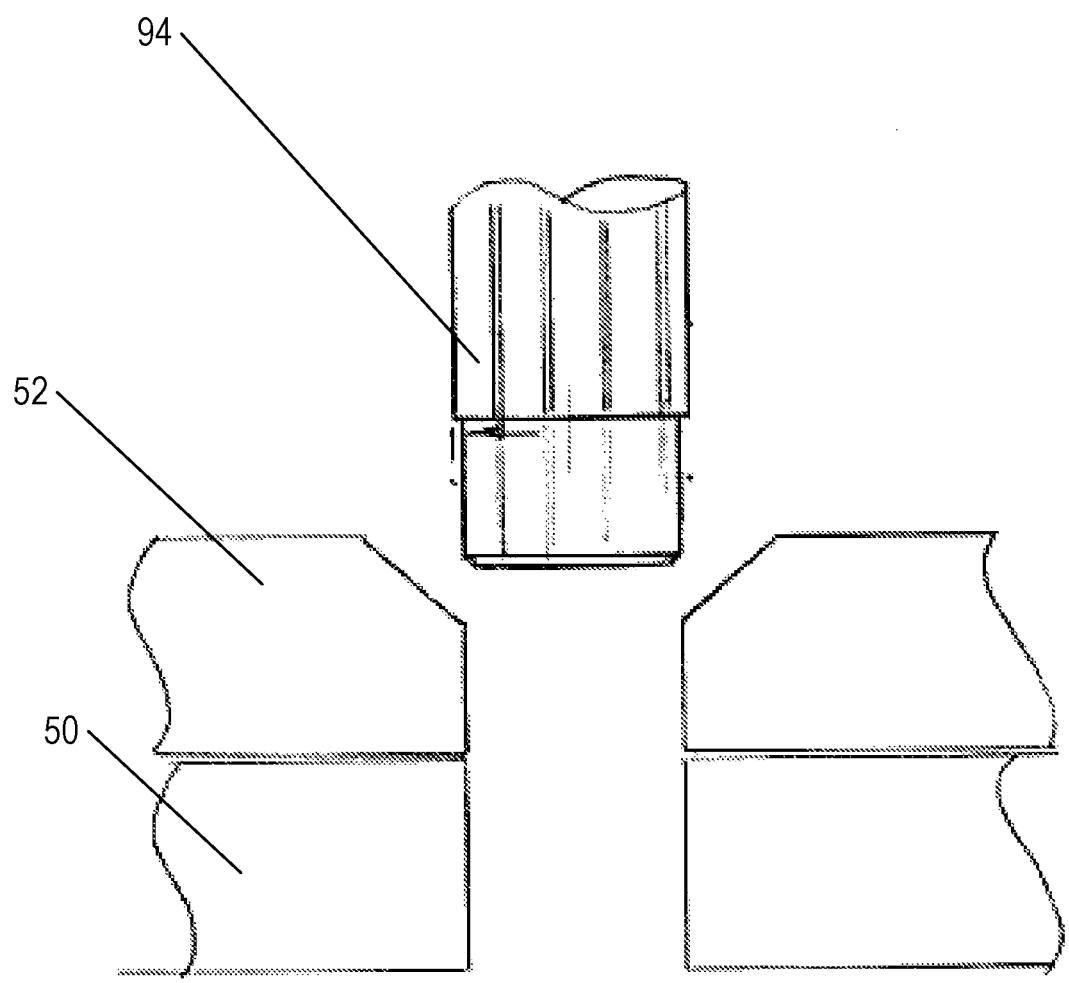
FIG. 5B illustrates exemplary finishing/reaming tooling used to finish the fastener holes of the new wing skin and the existing underlying wing structure.

After the pilot holes 56 are enlarged and made at least substantially concentric with the corresponding fastener holes 55 of the existing underlying wing structure 50 to form fastener holes in the new wing skin 52, at step 115 (of FIG. 1B) the resulting fastener holes may be finished by reaming the fastener holes of the new wing skin 52 to a final diameter (within acceptable tolerance limits) with a ream tool 94, as shown in FIG. 5B, that corresponds to the diameter of the fastener holes of the existing underlying wing structure 50 and/or by countersinking the exterior end of the fastener holes of the new wing skin 52 (corresponding to the exterior surface of the new wing skin) such that fasteners may be installed with their corresponding fastener heads at least substantially parallel with the exterior surface of the new wing skin 52 (within acceptable tolerance limits).

Accordingly, the pilot holes 56 extending through the new wing skin 52 may be provided merely to provide access for the mill bit 93 to be positioned through the new wing skin 52 and into the guide hole of the consumable bushing 83. The degree of precision required in positioning the pilot holes on the new wing skin 52 (e.g., the precision in positioning the holes in the skin template 61 and in positioning the pilot holes in the new wing skin 52 based on the holes of the skin template 61) ensures that the pilot holes are positioned entirely within the area of the new wing skin 52 that will be within the ultimate corresponding fastener hole of the new wing skin 52 with no portion of the original pilot hole extending outside of the perimeter of the corresponding fastener hole 55. Moreover, because the pilot holes 56 are positioned entirely within the perimeter of the corresponding fastener hole 55, any error in the positioning of the pilot hole 56 is eliminated (washed out) once the fastener hole 55 is milled out. During the milling process, at least some amount of material of the new wing skin 52 on all sides of the original pilot hole is removed, thereby eliminating any error in the positioning of the pilot hole. Thus, the positioning of the pilot hole does not ultimately determine the final position of the corresponding fastener hole, and instead the position of the guide hole of the consumable bushing determines the final placement of the fastener hole extending through the new wing skin 52. Any resulting error in the positioning of the fastener hole extending through the new wing skin 52 is entirely independent of the error in positioning the pilot hole through the new wing skin 52. Instead, any error in the positioning of the final fastener hole position may be due to errors in the positioning of the new wing skin 52 relative to the existing underlying wing structure (e.g., aligning edges of the new wing skin 52 properly relative to the existing underlying wing structure 50) errors in the size of the new wing skin 52, errors in the exterior diameter of the consumable bushings 83, errors in the diameter and/or positioning of the interior diameter of the guide hole relative to the consumable bushings 83, errors in the positioning of the mill bit 93 relative to the guide hole of the consumable bushing 83, errors in enlarging the pilot hole during the milling process, and/or errors in the diameter of the reamer tool 94. These errors may be significantly easier to keep within the ultimate manufacturing tolerance of placement of the fastener holes of the new wing skin 52 relative to the existing underlying wing structure 50, and accordingly the positioning and sizing of the fastener holes extending through the new wing skin 52 may remain within acceptable manufacturing tolerances.

Finally, at step 116 of FIG. 1B, fasteners are inserted through each of the fastener holes of the new wing skin 52 and existing underlying wing structure 50 to secure the new wing skin 52 to the underlying wing structure 50. For example, JO-BOLTS, HI-LOCKS, and/or the like may be utilized to secure the new wing skin 52 to the existing underlying wing structure 50. After securing fasteners within all of the fastener holes, the wing assembly may be reattached to the aircraft.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An assembly comprising:
   an existing underlying wing structure;
   a mill bit; and
   a consumable bushing to facilitate alignment of a new wing skin having a plurality of pilot holes therein onto the existing underlying wing structure having a plurality of fastener holes therein corresponding to each of the plurality of pilot holes,
   wherein the consumable bushing comprises:
      a body portion having a first end, a second end, and a first dimension between the first end and the second end, at least a portion of the body portion defining a guide hole having a second dimension and extending through the body portion between the first end and the second end; and
      a thin flange extending outward away from the body portion at least partially around the body portion and near the first end such that the thin flange has at least one dimension greater than the first dimension;
      wherein:
         the first dimension is sized such that the body portion fits within one of the fastener holes of the underlying wing structure such that the thin flange is positioned adjacent the underlying wing structure and the guide hole is substantially aligned with the fastener hole and is accessible through a corresponding pilot hole of a new wing skin aligned substantially relative to the underlying wing structure such that the mill bit may be positioned through the pilot hole and into the guide hole; and
         at least a portion of the body portion and the thin flange are consumable such that at least the portion of the body portion and the thin flange that are consumable are configured to be cut by the mill bit as the mill bit enlarges the pilot hole of the new wing skin.

2. The assembly of claim 1, wherein the first dimension is substantially the same as a diameter of the fastener holes of the underlying wing structure.

3. The assembly of claim 1, wherein the guide hole is a concentric hole extending through the body portion.

4. The assembly of claim 1, wherein the second dimension of the guide hole is smaller than the first dimension.

5. The assembly of claim 1, wherein the second dimension of the guide hole corresponds to a diameter of the mill bit.

6. The assembly of claim 1, wherein the mill bit has a diameter that is negligibly smaller than the dimension of the guide hole.

7. The assembly of claim 1, wherein the guide hole has a dimension smaller than the pilot hole of the new wing skin.

8. The assembly of claim 1, wherein the thin flange has a dimension greater than the first dimension.

9. The assembly of claim 1, wherein the thin flange is concentric with the body portion.

10. The assembly of claim 1, wherein the thin flange is circular shaped.

11. The assembly of claim 1, wherein the thin flange has a shape selected from the group consisting of: square, rectangular, triangular, regular polygonal shape, irregular polygonal shape, and non-polygonal two-dimensional.

12. The assembly of claim 1, wherein the thin flange is positioned at the first end of the body portion.

13. The assembly of claim 1, wherein the bushing is made of a material different than a material of any one or more of the mill bit, the wing skin, the skin template, or the existing underlying wing structure.

14. The assembly of claim 1, wherein the second dimension of the guide hole is negligibly larger than a dimension of a pilot guide of the mill bit.

15. The assembly of claim 1, wherein a pilot guide of the mill bit has a dimension that is negligibly smaller than the second dimension of the guide hole.

16. The assembly of claim 1, wherein:
   the body portion is a cylindrical body portion having a first diameter corresponding to the first dimension;
   the thin flange is concentric with the cylindrical body portion; and
   the guide hole is substantially concentric with the first diameter.

17. The assembly of claim 16, wherein the thin flange is circular shaped.

18. The assembly of claim 16, wherein the thin flange has a shape selected from the group consisting of: square, rectangular, triangular, regular polygonal shape, irregular polygonal shape, and non-polygonal two-dimensional.

19. The assembly of claim 16, wherein:
   the first diameter is substantially the same as a diameter of the fastener holes of the underlying wing structure;
   the second dimension of the guide hole is a diameter that substantially corresponds to a diameter of the mill bit;
   the diameter of the guide hole is smaller than the pilot hole of the new wing skin; and
   the thin flange has a diameter greater than the first diameter.

* * * * *